(12) United States Patent
Suto et al.

(10) Patent No.: US 12,703,237 B2
(45) Date of Patent: Aug. 11, 2026

(54) IN-WHEEL MOTOR

(71) Applicant: Hitachi, Ltd., Tokyo (JP)

(72) Inventors: Tetsuya Suto, Tokyo (JP); Akeshi Takahashi, Tokyo (JP); Makoto Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 293 days.

(21) Appl. No.: 18/292,549

(22) PCT Filed: Jul. 15, 2022

(86) PCT No.: PCT/JP2022/027863
§ 371 (c)(1),
(2) Date: Jan. 26, 2024

(87) PCT Pub. No.: WO2023/032486
PCT Pub. Date: Mar. 9, 2023

(65) Prior Publication Data

US 2024/0253447 A1 Aug. 1, 2024

(30) Foreign Application Priority Data

Aug. 31, 2021 (JP) ................................ 2021-140874

(51) Int. Cl.
*B60K 7/00* (2006.01)
*H02K 1/16* (2006.01)
(Continued)

(52) U.S. Cl.
CPC ............. *B60K 7/0007* (2013.01); *H02K 1/16* (2013.01); *H02K 7/102* (2013.01); *H02K 9/19* (2013.01)

(58) Field of Classification Search
CPC ........ B60K 7/0007; H02K 1/16; H02K 7/102; H02K 9/19
See application file for complete search history.

(56) References Cited

U.S. PATENT DOCUMENTS 3,770,074 A * 11/1973 Sherman ............... B60L 3/0061 180/370
3,974,895 A * 8/1976 Murphy .................. F16D 53/00 192/73

(Continued)

FOREIGN PATENT DOCUMENTS

CN 202507916 U 10/2012
CN 103879275 A * 6/2014 ........... B60K 17/046

(Continued)

OTHER PUBLICATIONS

International Search Report of PCT/JP2022/027863 dated Sep. 6, 2022.

(Continued)

*Primary Examiner* — Jacob B Meyer
(74) *Attorney, Agent, or Firm* — MATTINGLY & MALUR, PC

(57) ABSTRACT

An in-wheel motor with improved driving force has a simplified cooling structure for the motor and a braking device. The in-wheel motor has a motor that transmits motive power to a wheel, at least a portion of the motor being disposed inside the wheel; a first cooling part and a second cooling part that cool a stator of the motor; and a braking device that applies braking to the wheel. The braking device 25 is formed from a brake disc that rotates with the wheel and a brake caliper that induces braking by imparting friction to the brake disc. The brake caliper operates in the axial direction of the motor to induce braking in the brake disc. A portion of an axial-direction end of the brake caliper is in contact with the stator. The first cooling part and the second cooling part cool the braking device through the stator.

8 Claims, 5 Drawing Sheets

(51) Int. Cl.
*H02K 7/102* (2006.01)
*H02K 9/19* (2006.01)

(56) References Cited

U.S. PATENT DOCUMENTS 4,609,080 A * 9/1986 Sekella ................. F16D 55/228 318/372
5,057,728 A * 10/1991 Dammeyer ............. F16D 65/46 192/84.21
5,121,018 A * 6/1992 Oldakowski ......... H02K 7/1025 188/161
5,274,290 A * 12/1993 Fischer ............... F16D 65/0006 310/93
5,739,605 A * 4/1998 Lazorchak ............ F16D 27/004 310/78
5,982,063 A * 11/1999 Lutz ..................... H02K 7/1025 310/77
6,046,518 A * 4/2000 Williams .............. B60L 3/0061 310/43
6,892,841 B2 * 5/2005 Makuta ................... F16D 65/10 310/77
7,017,694 B2 * 3/2006 Shirazawa .............. B60L 50/66 310/68 B
7,214,155 B2 * 5/2007 Mueller ............... B60K 7/0007 475/5
7,612,477 B2 * 11/2009 Abe ........................ F16D 55/02 310/90
7,730,983 B2 * 6/2010 Tanaka ..................... B60K 6/48 180/65.265
8,678,117 B2 * 3/2014 Carabelli ................. H02K 7/14 301/6.5
9,550,414 B2 * 1/2017 Kudo .................. B60B 27/0015
10,118,479 B2 * 11/2018 Igi ....................... F16D 55/2265
10,300,982 B2 * 5/2019 Kiyokawa ............... G01P 3/487
10,532,649 B2 * 1/2020 Arrigoni .............. B60K 7/0007
10,717,494 B2 * 7/2020 Shahana ................ B62J 45/413
10,788,090 B2 * 9/2020 Wang ....................... H02K 7/14
11,424,650 B2 * 8/2022 Cacheux .................. A61G 5/04
12,005,784 B2 * 6/2024 Li .......................... H02K 7/116
12,202,349 B2 * 1/2025 Jeon ........................ F16C 41/00
2003/0189380 A1 * 10/2003 Ishikawa ................... B60L 7/10 188/161
2004/0063536 A1 * 4/2004 Atarashi ................ B60K 6/485 477/3
2009/0273249 A1 * 11/2009 Lamperth ............ B60K 7/0007 310/152
2010/0194180 A1 * 8/2010 Gibson ................... B60B 11/04 301/36.1
2021/0221218 A1 * 7/2021 Li ......................... F16D 65/827
2024/0253447 A1 * 8/2024 Suto ........................ F16D 65/02
2025/0033459 A1 * 1/2025 Suto ..................... H02K 5/1737
2025/0038617 A1 * 1/2025 Matsuda ................ H02K 21/22

FOREIGN PATENT DOCUMENTS

CN 103442918 B * 5/2017 ........... B60K 7/0007
DE 10 2008 004 083 A1 7/2009
DE 102019206270 A1 * 11/2020 ............... H02K 5/20
JP 08-068432 A 3/1996
JP 2004-129389 A 4/2004
JP 2005168120 A * 6/2005
JP 2005-337355 A 12/2005
JP 2006240429 A * 9/2006 ............... H02K 9/19
JP 2006-282158 A 10/2006
JP 2009-113722 A 5/2009
JP 2009-542496 A 12/2009
JP 2012-031978 A 2/2012
JP 2019194052 A * 11/2019
JP 2019194054 A * 11/2019
JP 2019194055 A * 11/2019
JP 2019194056 A * 11/2019
JP 2023061299 A * 5/2023
JP 2024137403 A * 10/2024
WO WO-2020090660 A1 * 5/2020 ............... B60K 7/00
WO WO-2023281964 A1 * 1/2023 ............... H02K 7/14
WO WO-2025033887 A1 * 2/2025 ......... B60B 27/0047

OTHER PUBLICATIONS

Extended European Search Report received in corresponding European Application No. 22864074.4 dated Jun. 5, 2025.

* cited by examiner

IN-WHEEL MOTOR

TECHNICAL FIELD

The present invention relates to an in-wheel motor that drives a vehicle wheel of a vehicle or the like.

BACKGROUND ART

As an in-wheel motor in which a brake unit and a motor are integrated, for example, there is a technique described in PTL 1. PTL 1 discloses an in-wheel motor including a wheel to which a tire is mounted and a motor that is disposed coaxially with the wheel and drives the wheel. The motor that drives the wheel is housed inside a housing. A brake unit that applies a braking force to the wheel is provided on the outer periphery of the housing. The brake unit includes a first passage through which a brake fluid supplied to the brake unit passes and a second passage through which a brake fluid discharged from the brake unit passes. At least one of the first passage and the second passage is disposed so as to wrap around the outside of the housing accommodating the motor, and cools the motor with the brake fluid passing through the first passage or the second passage wound around the outside of the housing.

CITATION LIST

Patent Literature

PTL 1: JP 2009-113722 A

SUMMARY OF INVENTION

Technical Problem

In order to improve the driving force, it is preferable to increase the outer diameter of the motor that drives the wheel so as to be as close to the outer diameter of the wheel as possible.

In the technique described in PTL 1, since the brake unit is disposed on the outer periphery of the housing that houses the motor, it is necessary to reduce the outer diameter of the motor by the amount of the brake unit disposed on the outer periphery of the housing, and there is a problem that the driving force is reduced.

In addition, in PTL 1, in order to cool the motor, at least one of the first passage and the second passage is disposed so as to wind around the outside of the housing, and thus there is a problem that the structure becomes complicated.

An object of the present invention is to solve the above problems and to provide an in-wheel motor in which a driving force of a motor is improved and a cooling structure of a motor and a brake device is simplified.

Solution to Problem

In order to achieve the above object, the present invention provides an in-wheel motor including a motor at least a part of which is disposed inside a wheel and which transmits power to the wheel, a cooling device that cools a stator of the motor, and a brake device that applies a brake to the wheel, in which the brake device includes a brake disc that rotates together with the wheel, and a brake caliper that applies friction to the brake disc for braking, the brake caliper operates in an axial direction of the motor to brake the brake disc, a part of an axial end portion of the brake caliper is in contact with the stator, and the cooling device cools the brake device via the stator.

Advantageous Effects of Invention

According to the present invention, it is possible to provide the in-wheel motor in which the driving force of the motor is improved and the cooling structure of the motor and the brake device is simplified.

DESCRIPTION OF EMBODIMENTS

Figure 1:
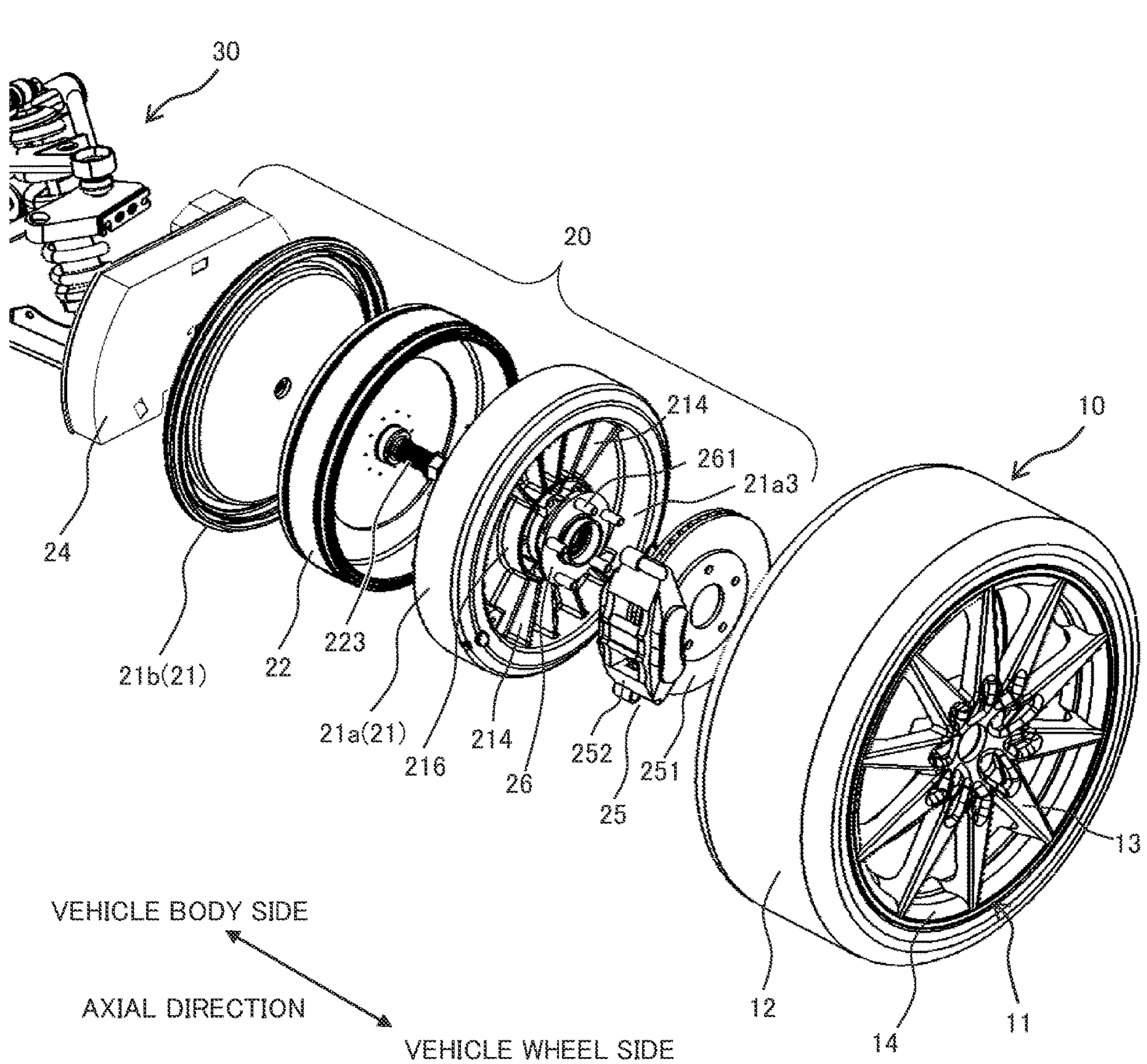
FIG. 1 is an exploded perspective view of a suspension device, an in-wheel motor, and a vehicle wheel according to an embodiment of the present invention.

Hereinafter, an embodiment of the present invention will be described with reference to the accompanying drawings. The same components are denoted by the same reference numerals, and the same description will not be repeated.

The various components of the present invention do not necessarily need to be independent and allow one component to be composed of a plurality of members, a plurality of components to be composed of one member, a certain component to be a part of another component, a part of one component and a part of another component to overlap, and the like.

Figure 2:
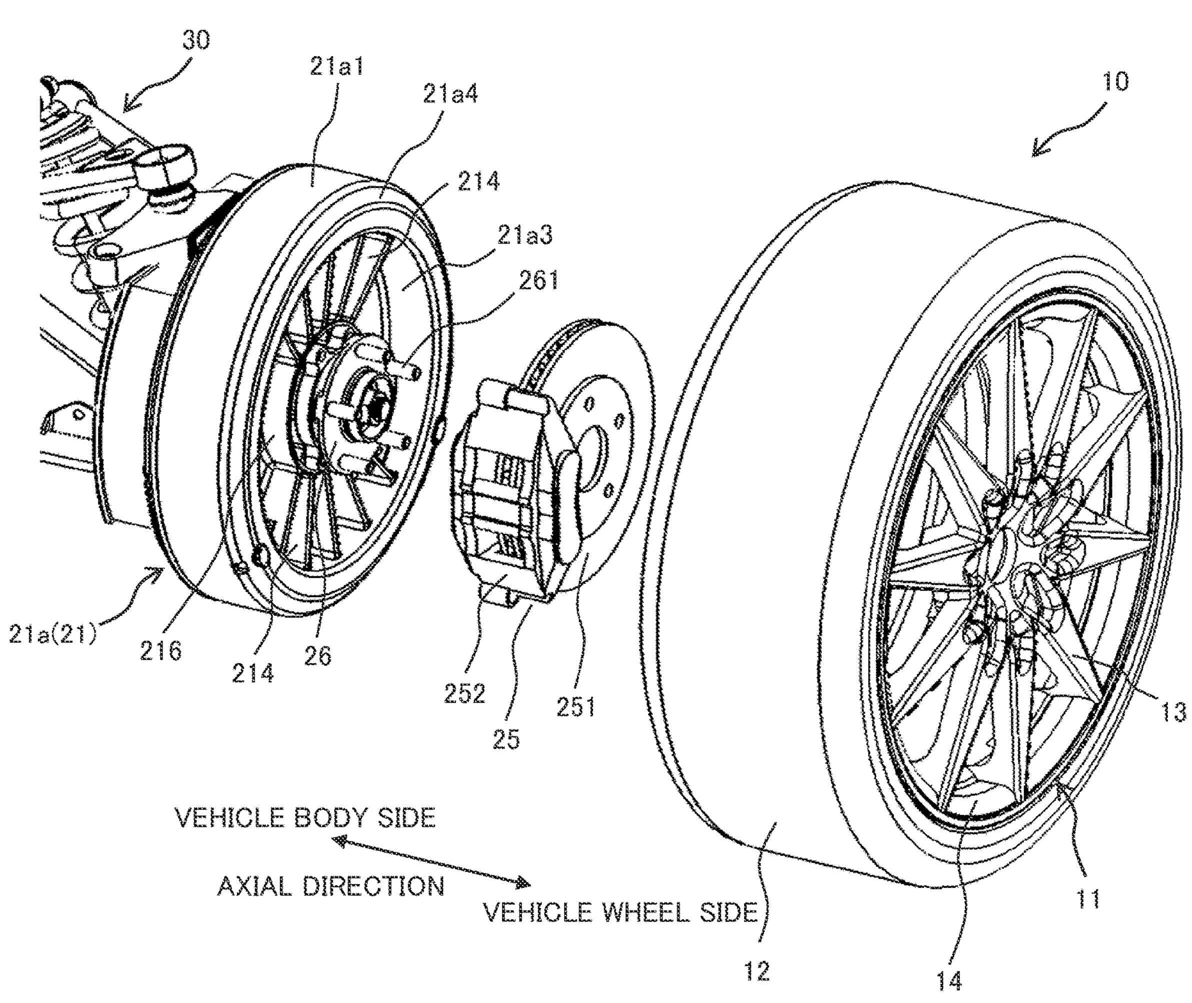
FIG. 2 is an exploded perspective view of the suspension device, the in-wheel motor, and the vehicle wheel in a state where the suspension device and the in-wheel motor according to the embodiment of the present invention are assembled.
Figure 3:
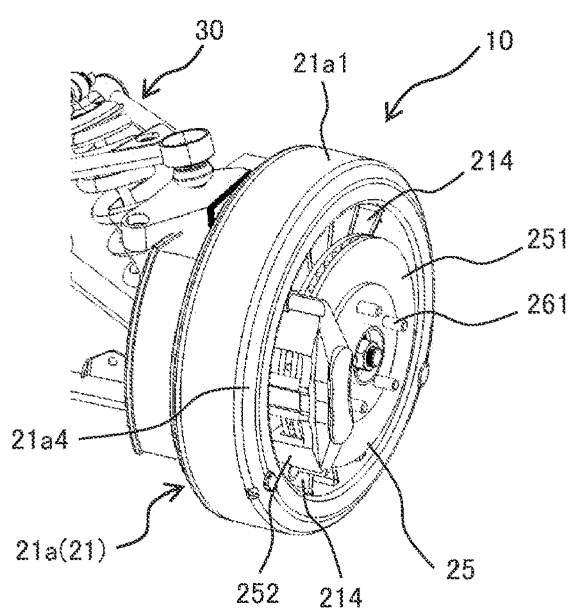
FIG. 3 is a perspective view in a state where the suspension device and the in-wheel motor according to the embodiment of the present invention are assembled.
Figure 4:
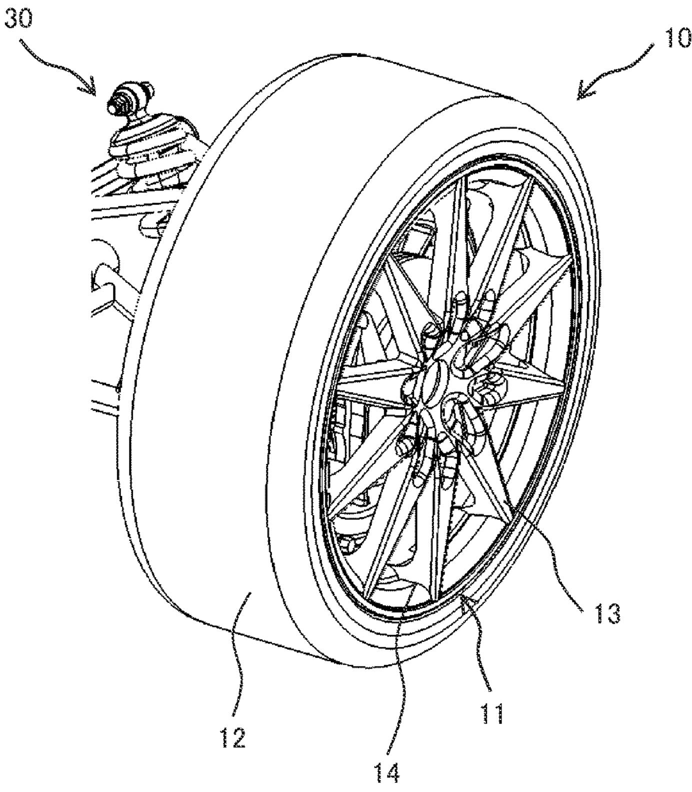
FIG. 4 is a perspective view in a state where the suspension device, the in-wheel motor, and the vehicle wheel according to the embodiment of the present invention are assembled.

FIG. 1 is an exploded perspective view of a suspension device, an in-wheel motor, and a vehicle wheel according to an embodiment of the present invention. FIG. 2 is an exploded perspective view of the suspension device, the in-wheel motor, and the vehicle wheel in a state where the suspension device and the in-wheel motor according to the embodiment of the present invention are assembled. FIG. 3 is a perspective view in a state where the suspension device and the in-wheel motor according to the embodiment of the present invention are assembled. FIG. 4 is a perspective view in a state where the suspension device, the in-wheel motor, and the vehicle wheel according to the embodiment of the present invention are assembled.

In FIGS. 1 to 4, only one wheel is shown. When a vehicle has four vehicle wheels, it is possible to provide an in-wheel motor on at least one vehicle wheel.

The vehicle wheel 10 includes a wheel 11 and a tire 12 mounted to the outer periphery of the wheel 11. The wheel 11 includes a plurality of spokes 13 radially extending radially outward from a central portion, and a rim 14 joined to the spokes 13. The tire 12 is mounted to the outer periphery of the rim 14. The spokes 13 are disposed offset so as to be located outside the vehicle with respect to the width direction of the rim 14.

An in-wheel motor 20 that rotationally drives the wheel 11 is connected to the vehicle wheel 10. At least a part of the in-wheel motor 20 is disposed inside the wheel 11.

The in-wheel motor 20 of the present embodiment refers to a driving means of a vehicle wheel housed in the wheel 11. The in-wheel motor 20 includes an inner rotor type and an outer rotor type, and further includes one including a reduction gear and one not including a reduction gear, and can be roughly classified into four types. In the present embodiment, an inner rotor type including no reduction gear (direct drive) will be described as an example, but an outer rotor type may be used.

The in-wheel motor 20 includes a stator housing 21*a* that is open on one side in the axial direction, a rotor 22 that is inserted into the stator housing 21*a* from the open side of the stator housing 21*a* and rotates inside the stator housing 21*a*, a stator housing cover 21*b* that closes the open side of the stator 21, an inverter device 24 fixed to the stator housing cover 21*b*, a brake device 25 fixed to the opposite open side of the stator housing 21*a*, and a hub bearing 26 that is rotatably supported by the stator housing 21*a* and rotates together with a brake disc 251 and the vehicle wheel 10.

The hub bearing 26 is fixed to a hub bearing mounting portion 216 formed in a central portion of the stator housing 21*a*. The hub bearing 26 includes a plurality of (five in the present embodiment) hub bolts 261. The hub bolt 261 penetrates the brake disc 251. The vehicle wheel 10 is fixed to the hub bearing 26 by inserting the hub bolt 261 into a through hole of the wheel 11 and screwing a nut (FIG. 4).

In the present embodiment, the stator housing 21*a* and the stator housing cover 21*b* constitute the stator 21. The stator 21 supports the inverter device 24, the brake device 25, the hub bearing 26, and the like, and is mounted to the suspension device 30 on the vehicle body side. As a result, the in-wheel motor 20 is mounted to the vehicle via the suspension device 30. In the in-wheel motor 20, the stator 21 (the stator housing 21*a* and the stator housing cover 21*b*) and the rotor 22 disposed inside the stator 21 constitute a motor that drives the wheel 11 (vehicle wheel 10).

In a steering wheel that is a vehicle wheel that changes a direction of a vehicle body, it is preferable to reduce an interval (scrubbing radius) between an intersection of a tire ground contact surface and a king-pin shaft that is a rotation center of steering and a center line in a width direction of the tire when viewed from a vehicle traveling direction. When the in-wheel motor is attached to the wheel, the axial direction of the in-wheel motor protrudes toward the vehicle body, the king-pin shaft is separated from the center position of the tire, and the scrubbing radius tends to be large. When the scrubbing radius increases, a large reaction force is applied to a steering mechanism at the time of steering operation, and the steering is easily taken by undulation or a step on a rough road surface when the vehicle travels on the rough road surface. In addition, when the steering wheel also serves as the drive wheel, the driving force becomes a rotational moment around the king-pin shaft, and thus there is a concern about deterioration in controllability and ride comfort. Therefore, it is preferable to reduce the length of the in-wheel motor in the axial direction. On the other hand, in order to improve the drive torque of the motor, it is preferable to increase the outer diameter of the motor. Furthermore, since the in-wheel motor includes the brake device, it is preferable to cool the heat generated by the brake device. Means for solving these problems will be described below.

Figure 5:
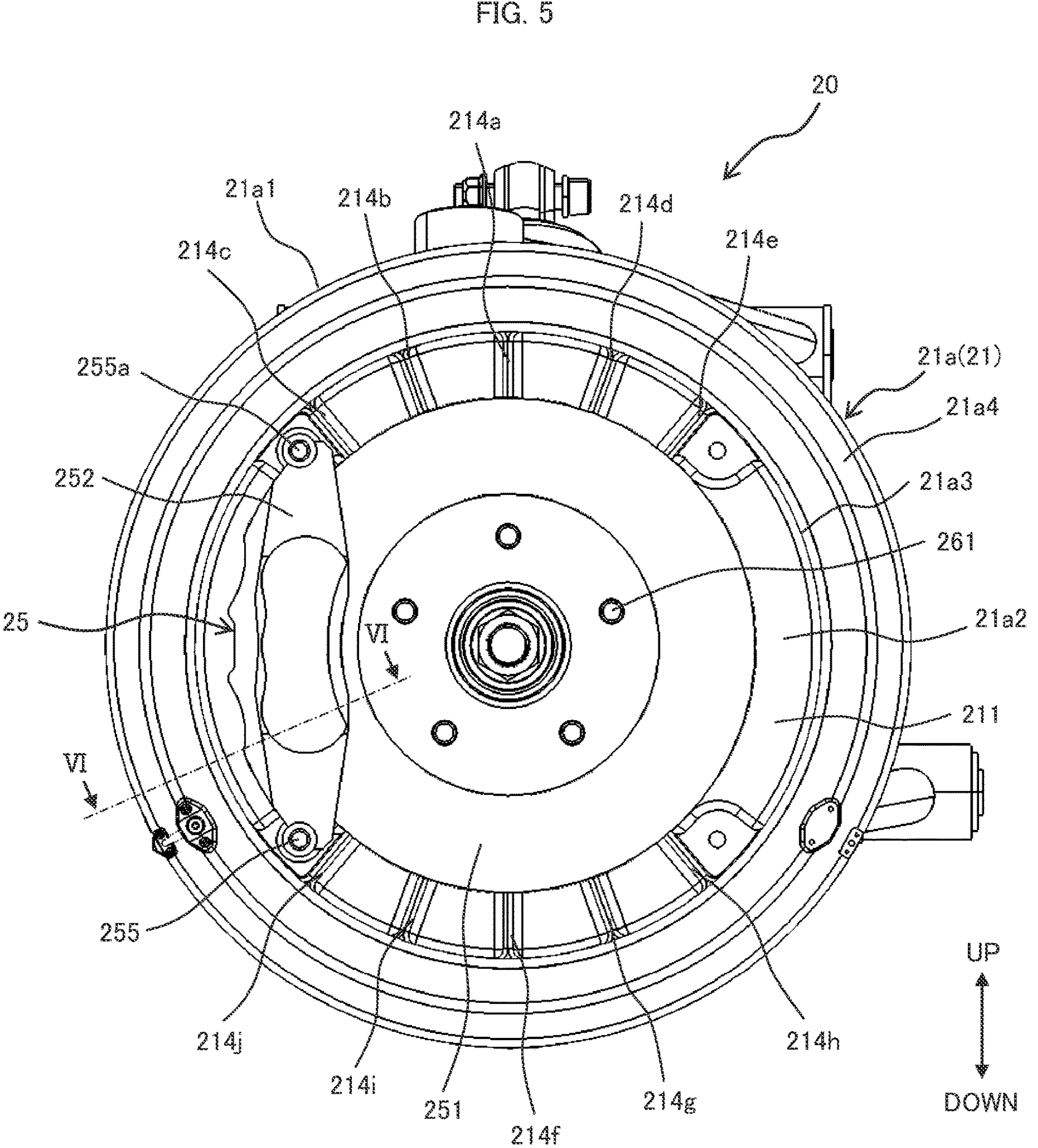
FIG. 5 is a front view of the in-wheel motor according to the embodiment of the present invention as viewed from the vehicle wheel side.
Figure 6:
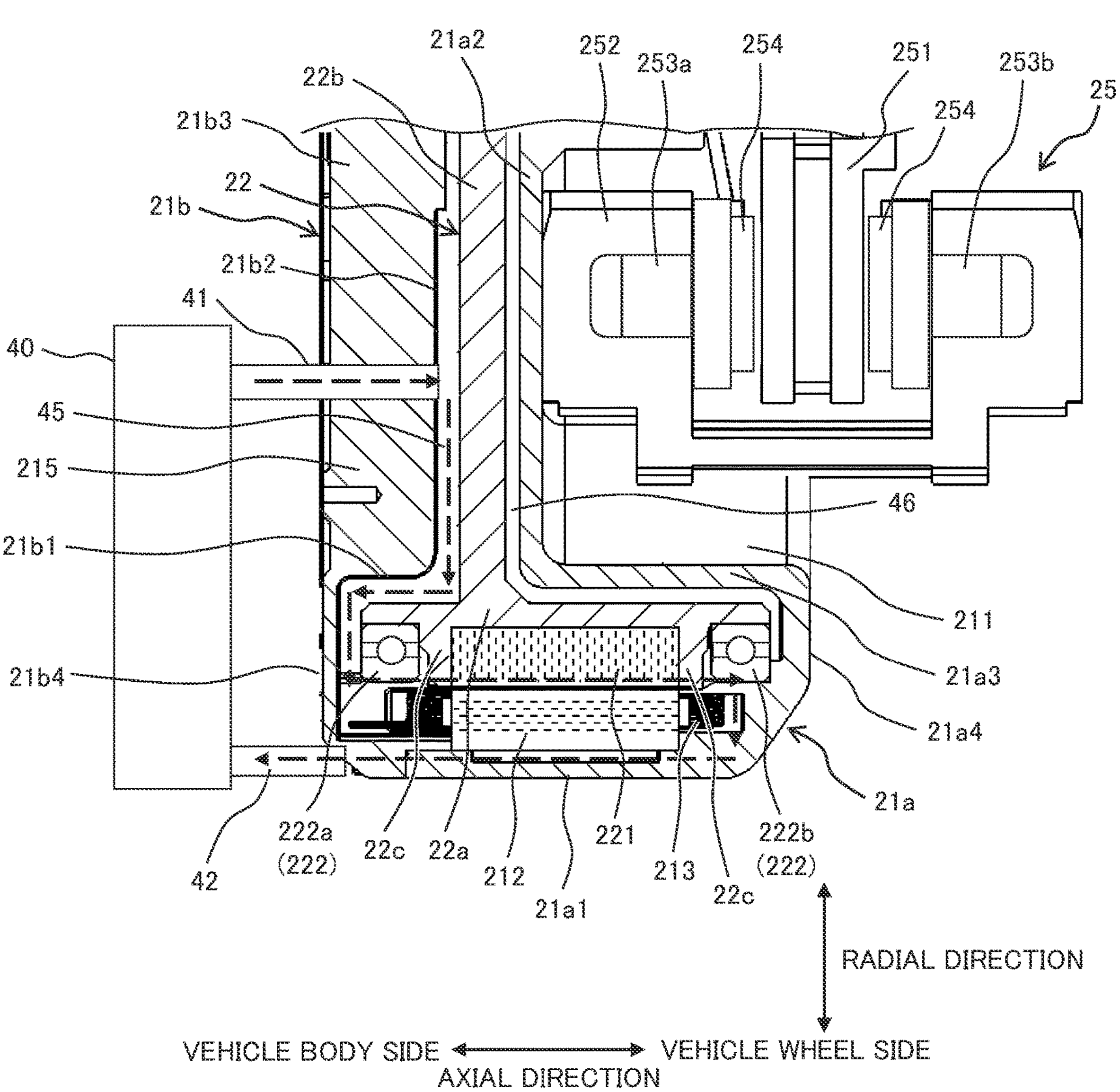
FIG. 6 is a cross-sectional view taken along line VI-VI of FIG. 5.

FIG. 5 is a front view of the in-wheel motor according to the embodiment of the present invention as viewed from the vehicle wheel side. FIG. 6 is a cross-sectional view taken along line VI-VI of FIG. 5.

One side (the vehicle body side in the present embodiment) of the stator housing 21*a* in the axial direction is opened. The stator housing 21*a* includes a cylindrical housing annular portion 21*al* extending in the axial direction, a housing flat plate portion 21*a*2 extending in the radial direction orthogonal to the axial direction, a folded portion 21*a*3 extending in the axial direction and having one end connected to the housing flat plate portion 21*a*2, and a flange portion 21*a*4 extending in the radial direction orthogonal to the axial direction and connected to the other ends of the housing annular portion 21*al* and the folded portion 21*a*3.

The housing flat plate portion 21*a*2 is disposed on the open portion side (the vehicle body side in the present embodiment) from the position of the flange portion 21*a*4 (end portion of the housing annular portion 21*al* on the opposite open portion side) via the folded portion 21*a*3. In other words, the housing flat plate portion 21*a*2 is disposed to be recessed from the position of the flange portion 21*a*4 (end portion of the housing annular portion 21*al* on the opposite open portion side) toward the open portion side (the vehicle body side in the present embodiment). That is, the stator housing 21*a* is formed with a housing recess 211 that is recessed from the position of the flange portion 21*a*4 (end portion on the opposite open portion side) toward the open portion side. In addition, a plurality of stator cores 212 are disposed radially inside the housing annular portion 21*al* of the stator housing 21*a*, and the stator coil 213 is attached to the stator core 212.

The stator housing cover 21*b* is disposed so as to close the open side of the stator housing 21*a*. The stator housing cover 21*b* includes a ring-shaped housing cover flange portion 21*b*4 extending in the radial direction orthogonal to the axial direction and located on the outer peripheral side, a cylindrical housing cover annular portion 21*b*1 extending in the axial direction and having one end connected to the housing cover flange portion 21*b*4, a housing cover flat plate portion 21*b*2 connected to the other end of the housing cover annular portion 21*b*1 and extending in the radial direction orthogonal to the axial direction, and a rib 21*b*3 as a reinforcing member provided in the housing cover flat plate portion 21*b*2.

The housing cover flat plate portion 21*b*2 is formed to be positioned on the opposite open portion side (the vehicle wheel side in the present embodiment) from the position of the housing cover flange portion 21*b*4 in a state where the stator housing cover 21*b* closes the open side of the stator housing 21*a*. In other words, the housing cover flat plate portion 21*b*2 is disposed to be recessed from the position of the housing cover flange portion 21*b*4 toward the opposite open portion side (the vehicle wheel side in the present embodiment). In the stator housing cover 21*b*, a housing cover recess 215 recessed from the position of the housing cover flange portion 21*b*4 (end portion on the open portion side) toward the opposite open portion side is formed, and a rib 21*b*3 is disposed in the housing cover recess 215.

The housing cover flange portion 21*b*4 is connected to and fixed to the housing annular portion 21*al* of the stator housing 21*a*. A space is formed inside the stator 21.

In the space inside the stator 21, the rotor 22 for rotationally driving the vehicle wheel is disposed. The rotor 22 includes a rotation shaft 223 (FIG. 1). The rotor 22 includes a cylindrical rotor housing 22*a* extending in the axial direction and a rotor flat plate portion 22*b* extending in the radial direction orthogonal to the axial direction. The rotor flat plate portion 22*b* is disposed closer to the vehicle body side from the center position of the rotor housing 22*a* in the axial direction. On the radially outer side of the rotor housing 22*a*, two support portions 22*c* protruding radially outward are formed.

In addition, a plurality of permanent magnets 221 are provided on the radially outer side of the rotor housing 22*a* so as to be sandwiched by the support portions 22*c*. The permanent magnets 221 are disposed so as to face the stator core 212 with a predetermined gap. Furthermore, on the radially outer side of the rotor housing 22*a*, a first bearing 222*a* and a second bearing 222*b* as motor bearings 222 that rotatably support the rotor 22 with respect to the stator 21 are provided. The first bearing 222*a* is disposed on the vehicle body side, and the second bearing 222*b* is disposed on the vehicle wheel side opposite to the vehicle body side. The motor bearing 222 has rolling elements between the outer ring portion and the inner ring portion.

The brake device 25 is mounted to the stator housing 21*a*. The brake device 25 includes a brake disc 251 that rotates together with the rotor 22, the hub bearing 26, and the wheel 11, and a brake caliper 252 that applies a frictional force to the brake disc 251 to apply a brake to the wheel. The brake device 25 operates in the same direction as the axial direction of the rotation shaft 223 of the motor.

A brake device for a vehicle which drives vehicle wheels by a motor is mainly an electric brake such as a regenerative brake or a waste electric brake, but it is also necessary to provide a mechanical brake in preparation for an electric brake failure at the time of sudden braking or full charge. Examples of the mechanical brake include a drum brake and a disc brake. In order to improve controllability of the brake device, a disc brake is used as a mechanical brake in the present embodiment.

As illustrated in FIG. 6, a part of the brake device 25 is accommodated in the housing recess 211 of the stator housing 21*a*. As a result, the overall length of the in-wheel motor 20 in the axial direction can be shortened.

The housing recess 211 of the stator housing 21*a* is provided with a plurality of ribs 214 (reinforcing members) connecting the folded portion 21*a*3 and the hub bearing mounting portion 216. The plurality of ribs 214 are radially disposed vertically from the hub bearing mounting portion 216. Among the plurality of ribs 214 disposed on the upper side, a rib 214*a* is disposed at a position in the vertical direction (90 degrees) from the horizontal position. A rib 214*b* is disposed in a direction opening from the rib 214*a* by 20 degrees, that is, at a position 110 degrees from the horizontal position. A rib 214*c* is disposed in a direction opening from the rib 214*a* by 40 degrees, that is, at a position 130 degrees from the horizontal position. A rib 214*d* is disposed in a direction closing 20 degrees from the rib 214*a*, that is, at a position 70 degrees from the horizontal position. A rib 214*e* is disposed in a direction closing 40 degrees from the rib 214*a*, that is, at a position 50 degrees from the horizontal position.

On the other hand, among the plurality of ribs 214 disposed on the lower side, a rib 214*f* is disposed at a position in the vertical direction (270 degrees). A rib 214*g* is disposed in a direction opening from the rib 214*g* by 20 degrees, that is, at a position 290 degrees from the horizontal position. A rib 214*h* is disposed in a direction opening from the rib 214*f* by 40 degrees, that is, at a position 310 degrees from the horizontal position. A rib 214*i* is disposed in a direction closing 20 degrees from the rib 214*f*, that is, at a position 250 degrees from the horizontal position. A rib 214*j* is disposed in a direction closing 40 degrees from the rib 214*a*, that is, at a position 230 degrees from the horizontal position.

In the present embodiment, a part of the brake device 25 is accommodated in the housing recess 211 of the stator housing 21*a*. In order to avoid interference between the rib 214 and the brake device 25, no rib is formed between the rib 214*c* and the rib 214*i* and between the rib 214*e* and the rib 214*h* in the present embodiment. In the present embodiment, the brake device 25 is disposed in the housing recess 211 in which no rib 214 is formed.

The rib 214 functions as a reinforcing member of the stator 21, and the strength between the rib 214*c* and the rib 214*i* and between the rib 214*e* and the rib 214*h* decreases. The traveling vehicle wheel 10 receives a load in the up-down direction due to the unevenness of the road surface. The in-wheel motor 20 provided in the vehicle wheel 10 receives a load in the up-down direction similarly to the vehicle wheel 10. Therefore, the rib 214 disposed in the stator housing 21*a* may be disposed so as to receive a load in the up-down direction, and even when the rib 214 is not disposed between the rib 214*c* and the rib 214*i* and between the rib 214*e* and the rib 214*h*, the strength of the stator 21 can be ensured. In the present embodiment, since the rib 214 is not disposed between the rib 214*c* and the rib 214*i* and between the rib 214*e* and the rib 214*h*, the in-wheel motor 20 can be reduced in weight, and the underspring mass can be reduced. In the present embodiment, the followability of the suspension device 30 to the unevenness of the road surface is improved by reducing the underspring mass, and the ride comfort of the vehicle can be improved.

In order to ensure the strength of the stator 21 in the up-down direction, the rib 214 may be provided in a range of 45 degrees in the opening direction and the closing direction from the vertical position, that is, in a range of 45 degrees to 135 degrees in the upper portion and in a range of 225 degrees to 315 degrees in the lower portion.

Furthermore, in the present embodiment, the brake caliper 252 is disposed such that the longitudinal direction thereof is the up-down direction (vertical direction). Both end portions of the brake caliper 252 are fixed to the stator 21 (stator housing 21*a*) by fixing bolts 255*a* and 255*b*. That is, the upper portion of the brake caliper 252 is fixed to the stator housing 21*a* by the fixing bolt 255*a*, and the lower portion of the brake caliper 252 is fixed to the stator housing 21*a* by the fixing bolt 255*b*. In the present embodiment, since the brake caliper 252 is disposed such that the longitudinal direction thereof is i the up-down direction (vertical direction), in the up-down direction can be received by the brake caliper 252 itself, and the strength of the stator 21 can be improved. In addition, since the brake caliper 252 is fixed to the stator housing 21*a* from the vehicle wheel 10 (wheel 11) side, it is easy to approach the brake caliper 252, and workability such as replacement of the brake pad 254 attached to the brake caliper 252 can be improved.

The brake caliper 252 includes pistons 253*a* and 253*b* that operate in the axial direction by the hydraulic pressure of the brake fluid and are disposed to face each other with the brake disc 251 interposed therebetween, and a brake pad 254 that is pressed against the brake disc 251 by the pistons 253*a* and 253*b* and generates a braking force by a frictional force. The brake pad 254 generates a braking force so as to sandwich the brake disc 251. The brake disc 251 is installed between the hub bearing 26 and the wheel 11. The brake disc 251 may be a ventilated disc or a solid disc. The material of the brake disc 251 is cast iron or the like.

Since the braking force increases and the heat generation decreases as the brake device increases in size, it is preferable that the brake device increases in size (increases in diameter). On the other hand, in order to improve the torque of the motor, it is preferable to increase the diameter of the motor. When the diameters of both the brake device and the motor are increased, the brake device and the motor overlap in the axial direction, and the axial length of the in-wheel motor (brake device+motor) increases.

In the present embodiment, the brake device is downsized, and a part thereof is accommodated in the housing recess 211 of the stator housing 21*a*. As a result, the overall length of the in-wheel motor 20 in the axial direction can be shortened.

In the present embodiment, since the brake device is downsized, heat generation at the time of brake operation increases. Main troubles of the hydraulic brake device are a vapor lock phenomenon and a fade phenomenon. The vapor lock phenomenon is a phenomenon in which the brake fluid boils due to heat generation of the brake device, air bubbles are generated, and the hydraulic pressure does not work. The fade phenomenon is a phenomenon in which the friction material of the brake pad is thermally decomposed by heat generation of the brake, gas is generated, and the frictional force is reduced. Both are caused by heat generation of the brake device, and if the vehicle weight is the same, it is more likely to occur as the brake device is downsized. In addition to safety, it is desirable to reduce the size and weight of the brake device from the viewpoint of reducing the underspring mass (improving the ride comfort).

A method for cooling the brake device will be described. A liquid refrigerant is used for cooling the brake device. A heat exchanger 40 is connected to the in-wheel motor 20. The stator housing cover 21*b* is connected with a first pipe 41 for supplying the liquid refrigerant from the heat exchanger 40 to the internal space of the stator 21 and a second pipe 42 for returning the liquid refrigerant from the internal space of the stator 21 to the heat exchanger 40. The internal space of the stator (the space formed by the stator housing 21*a* and the stator housing cover 21*b*) is filled with the liquid refrigerant. The heat exchanger 40 is, for example, a radiator, and cools the liquid refrigerant with traveling wind during traveling. A pump (not illustrated) is provided in a path connecting the heat exchanger 40 and the first pipe 41, and the liquid refrigerant in the internal spaces of the heat exchanger 40 and the stator 21 is circulated through the first pipe 41 and the second pipe 42. The rotor 22 rotates in the internal space of the stator 21 filled with the liquid refrigerant.

The internal space of the stator 21 includes a first cooling portion 45 formed between the stator housing cover 21*b* and the rotor 22, and a second cooling portion 46 formed between the stator housing 21*a* and the rotor 22. In other words, the rotor 22 partitions the internal space of the stator 21 into the first cooling portion 45 and the second cooling portion 46. The rotor 22 partitions the internal space of the stator 21 into the first cooling portion 45 and the second cooling portion 46.

The liquid refrigerant flowing from the heat exchanger 40 into the first cooling portion 45 via the first pipe 41 flows radially outward as indicated by an arrow indicated by a broken line, collides with the rotor housing 22*a*, and then flows to the vehicle body side along the axial direction. Further, the liquid refrigerant changes its direction, flows through the gap between the permanent magnet 221 and the stator core 212, changes its direction again, flows along the outer periphery of the stator core 212, and flows into the heat exchanger 40 via the second pipe 42. As described above, the liquid refrigerant flows in the space, whereby the motor can be cooled. On the other hand, the liquid refrigerant in the second cooling portion 46 does not circulate and stays.

A part of the brake caliper 252 is disposed at a position overlapping the stator 21 (stator housing 21*a*) in the radial direction. The brake caliper 252 is disposed on the inner diameter side of the stator core 212. The axial end surface (part of the axial end portion) of the brake caliper 252 (brake device 25) is in contact with the housing flat plate portion 21*a*2 (stator 21). In other words, the axial end surface of the brake caliper 252 (brake device 25) and the housing flat plate portion 21*a*2 (stator 21) are in surface contact with each other. The brake caliper 252 may be in contact via an elastic body (grease, rubber) having a Young's modulus smaller than those of the brake caliper 252 and the stator 21.

When the brake device 25 is operated, the brake pad 254 presses the brake disc 251, and obtains a braking force by a frictional force. At this time, friction heat is generated when the brake pad 254 comes into contact with the brake disc 251. For example, at the time of sudden braking, the brake caliper 252 rises in temperature to about 300° C. In the present embodiment, since the axial end surface of the brake caliper 252 (brake device 25) and the housing flat plate portion 21*a*2 (stator 21) are in surface contact with each other, the heat generated by the brake caliper 252 is transmitted to the housing flat plate portion 21*a*2 (stator). The heat transferred to the housing flat plate portion 21*a*2 (stator) is transferred to the liquid refrigerant in the second cooling portion 46, the rotor 22, and the liquid refrigerant in the first cooling portion 45. Since the liquid refrigerant circulates in the first cooling portion 45, the heat received by the liquid refrigerant in the first cooling portion 45 is supplied to the heat exchanger 40 and cooled by the heat exchanger 40. As a result, the motor is cooled and the brake caliper 252 is cooled. In the present embodiment, the heat exchanger 40, the first pipe 41, the second pipe 42, the first cooling portion 45, and the second cooling portion 46 constitute a cooling device of the motor and the brake device 25.

In the present embodiment, the liquid refrigerant in the second cooling portion 46 does not circulate but stays. When the temperature of the brake caliper 252 rises to about 300° C. at the time of sudden braking, the temperature of the liquid refrigerant rapidly rises to a high temperature. When the high-temperature liquid refrigerant circulates, devices such as a pump and a motor in contact with the liquid refrigerant may be damaged by heat.

Therefore, in the present embodiment, the first cooling portion 45 through which the liquid refrigerant circulates is in contact with the brake caliper 252 via the second cooling portion 46. At the time of sudden braking, the heat generated in the brake caliper 252 is transmitted to the liquid refrigerant in the first cooling portion 45 after the liquid refrigerant staying in the second cooling portion 46 receives the heat. Therefore, it is possible to suppress the liquid refrigerant in the first cooling portion 45 from rapidly rising to a high temperature, and it is possible to suppress damage to the pump, the motor, and the like.

As described above, according to the present embodiment, it is possible to provide the in-wheel motor in which the driving force of the motor is improved and the cooling structure of the motor and the brake device is simplified.

The present invention is not limited to the embodiments described above, but includes various modifications. For example, the embodiment described above has been described in detail for easy understanding of the present invention, and is not necessarily limited to that having all the configurations described.

REFERENCE SIGNS LIST

10 vehicle wheel
11 wheel
12 tire
13 spoke
14 rim
20 in-wheel motor
21 stator
21*a* stator housing
21*a*1 housing annular portion
21*a*2 housing flat plate portion
21*a*3 folded portion
21*a*4 flange portion
21*b* stator housing cover
21*b*1 housing cover annular portion
21*b*2 housing cover flat plate portion
21*b*3 rib
22 rotor
22*a* rotor housing
22*b* rotor flat plate portion
22*c* support portion
24 inverter device
25 brake device
26 hub bearing
30 suspension device
40 heat exchanger
41 first pipe
42 second pipe
45 first cooling portion
46 second cooling portion
211 housing recess
212 stator core
213 stator coil
214, 214*a* to 214*j* rib
215 housing cover recess
216 hub bearing mounting portion
221 permanent magnet
222 motor bearing
222*a* first bearing
222*b* second bearing
223 rotation shaft
251 brake disc
252 brake caliper
253*a*, 253*b* piston
254 brake pad
255*a*, 255*b* fixing bolt
261 hub bolt

The invention claimed is:

1. An in-wheel motor, comprising:
a motor at least a part of which is disposed inside a wheel and which transmits power to the wheel;
a cooling device that cools a stator of the motor; and
a brake device that applies a brake to the wheel,
wherein the brake device includes a brake disc that rotates together with the wheel, and a brake caliper that applies friction to the brake disc for braking,
wherein the brake caliper operates in an axial direction of the motor to apply a brake to the brake disc,
wherein a part of an axial end portion of the brake caliper is in contact with the stator,
wherein the cooling device cools the brake device via the stator,
wherein the cooling device includes a liquid refrigerant,
wherein the cooling device includes a first cooling portion through which the liquid refrigerant circulates and a second cooling portion through which the liquid refrigerant does not circulate, and
wherein the brake caliper is in contact with the first cooling portion via the second cooling portion.

2. The in-wheel motor according to claim 1, wherein
the stator includes a stator housing that is open on one side in an axial direction and includes a rotor inside, and a stator housing cover that closes an open side of the stator housing,
the stator housing includes a housing annular portion having a cylindrical shape and extending in the axial direction, and a housing flat plate portion extending in a radial direction orthogonal to the axial direction, and
in the brake caliper, an axial end surface of the brake caliper is in contact with the housing flat plate portion.

3. The in-wheel motor according to claim 1, wherein the brake caliper is in contact with the stator via an elastic body having a Young's modulus smaller than Young's moduli of the brake caliper and the stator.

4. The in-wheel motor according to claim 1, wherein a part of the brake caliper is disposed at a position overlapping the stator in a radial direction.

5. The in-wheel motor according to claim 4, wherein
the stator includes a stator core to which a stator coil is attached, and
the brake caliper is disposed on an inner diameter side of the stator core.

6. The in-wheel motor according to claim 1, wherein the first cooling portion and
the second cooling portion are formed by partitioning an internal space of the stator with a rotor.

7. The in-wheel motor according to claim 1, wherein
the brake caliper is disposed such that a longitudinal direction of the brake caliper is an up-down direction, and
both end portions of the brake caliper in the up-down direction are fixed to the stator by fixing bolts.

8. The in-wheel motor according to claim 1, wherein the brake caliper is fixed to the stator from the wheel.

* * * * *